March 24, 1970 K. A. NYHUS ET AL 3,503,031

PRINTED CIRCUIT KEYBOARD

Filed Feb. 11, 1969 2 Sheets-Sheet 1

INVENTORS
KEITH A. NYHUS
RICHARD M. SEDRO

BY Cushman, Darby & Cushman
ATTORNEYS

INVENTORS
KEITH A. NYHUS
RICHARD M. SEDRO
BY
Cushman Darby & Cushman
ATTORNEYS

United States Patent Office 3,503,031
Patented Mar. 24, 1970

3,503,031

PRINTED CIRCUIT KEYBOARD

Keith A. Nyhus, Minneapolis, and Richard M. Sedro, St. Paul, Minn., assignors to Control Data Corporation, Minneapolis, Minn., a corporation of Delaware Filed Feb. 11, 1969, Ser. No. 798,424
Int. Cl. H01c 9/06
U.S. Cl. 338—99 16 Claims

ABSTRACT OF THE DISCLOSURE

A keyboard of extremely compact size and thickness wherein a common bus of the keyboard is normally electrically isolated from each of a plurality of individual circuits by means of a pressure-sensitive material characterized by a resistivity which varies inversely with the application of pressure thereto. An electrical circuit may be completed between the bus and any one of the individual circuits by the application of pressure by the keyboard operator to a selected area of the keyboard. The keyboard is also adapted to be directly plugged into associated connectors and circuitry.

Figure 1:
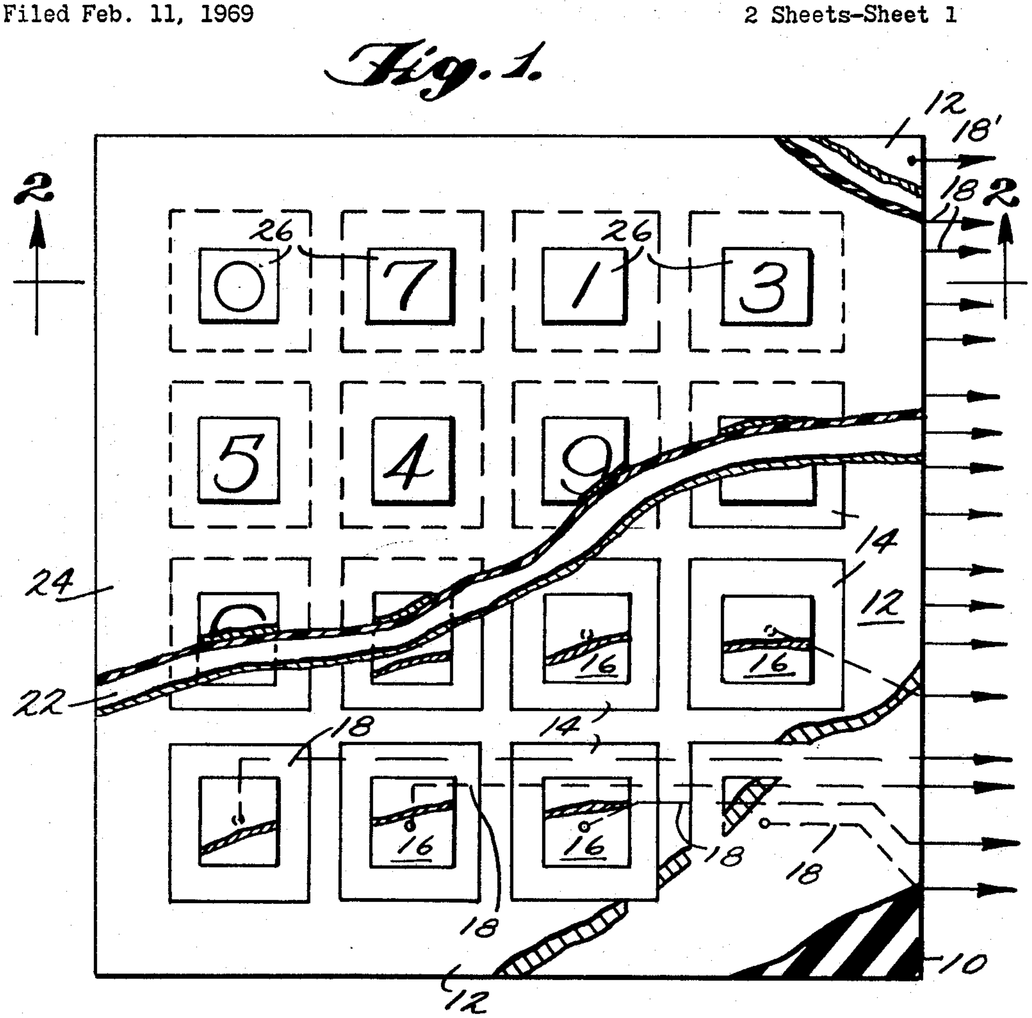

In a wide variety of electronic fields, it has been the general practice to utilize keyboards to perform various operations. The keyboards heretofore utilized have usually been of considerable size and have included mechanical keys and associated linkages. Although such devices have served the purpose, they have not proved entirely satisfactory under all conditions of service since the often complex mechanical arrangements are subject to fatigue and thus require periodic repair or replacement. In addition, with the advent of the computer and the efforts to miniaturize, the use of such relative bulky mechanical keyboards has not been entirely satisfactory. Furthermore, the mechanical keyboards are often characterized by contact bounce, thus requiring the design of additional circuitry to compensate therefore where only single activations of a circuit is desired, such as in stepping a computer through a program. In addition to requiring the design of compensating circuitry, such contact bounce present in mechanical keyboards may present a security problem since unique contact bounce signatures may enable the identification of a particular keyboard.

Accordingly, the general purpose of this invention is to provide a unique printed circuit keyboard which embraces all the advantages of similarly employed mechanical keyboards and possesses none of the aforedescribed disadvantages. To attain this, the present invention contemplates an arrangement of conductors having a pressure-sensitive paint located therebetween which is characterized by having an electrical resistance which varies inversely according to the pressure applied to the paint. The invention includes a plurality of spaced electrical conducting pads affixed to an insulating base member wherein each of the pads is separated from a conducting layer or sheet by the pressure-sensitive paint and wherein each of the pads is electrically connected to a separate electrical circuit whereby a particular one of the electrical circuits may be activated by pressing the conducting layer toward a respective pad so as to compress the paint located therebetween and to reduce its electrical resistance thereby enabling the completion of an electrical circuit between the conducting layer and the circuit associated with the selected pad.

An object of the present invention, therefore, is the provision of a keyboard which has no moving parts and which is not subject to fatigue.

Another object is to provide a printed circuit keyboard which is small and compact so as not to require back-panel space.

A further object of the invention is the provision of a printed circuit keyboard which is adapted to be directly plugged into associated connectors and circuitry.

Still another object is to provide a keyboard which eliminates contact bounce.

Yet another object of the present invention is the provision of a printed circuit keyboard having a relatively low radiation level so as to enhance transmission security in communications.

A still further object is to provide a keyboard of greatly reduced cost which requires little or no maintenance.

Figure 2:
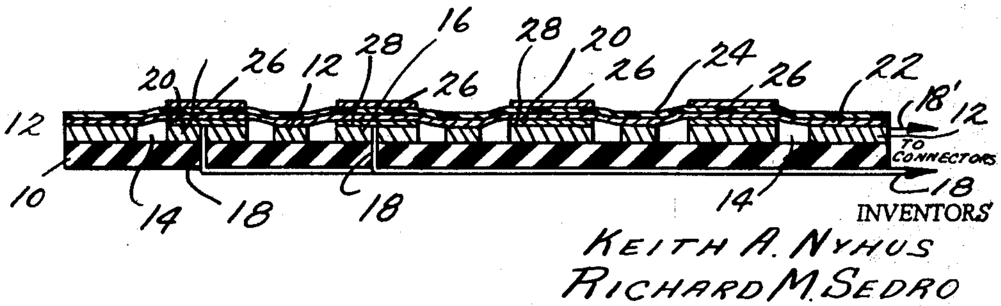
Figure 3:
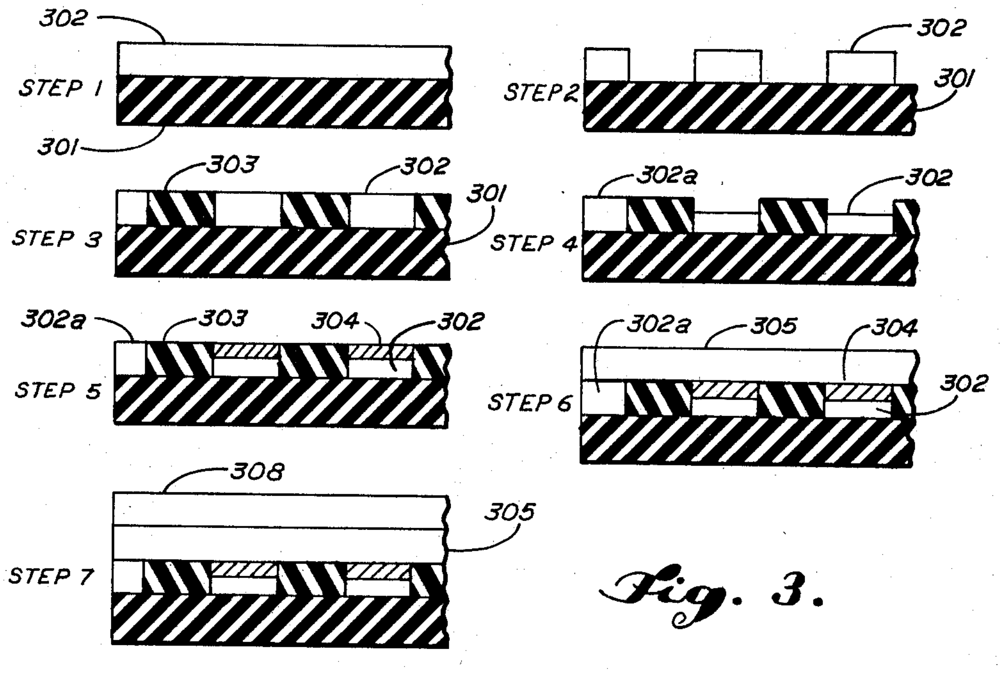
Figure 4:
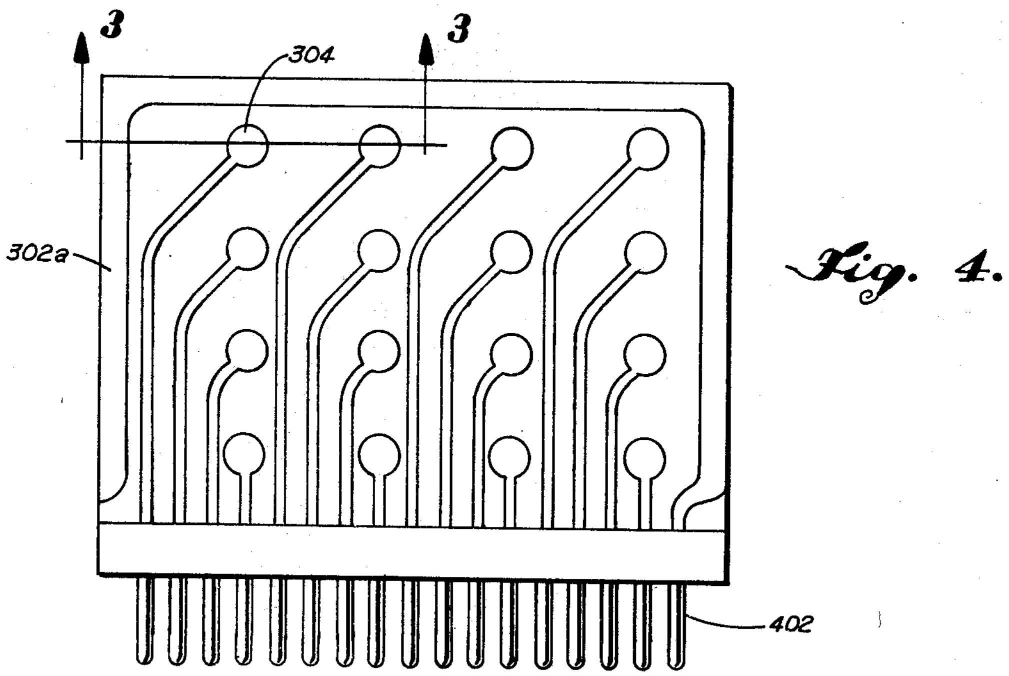

Other objects and features of the invention will become apparent to those skilled in the art as the disclosure is made in the following description of a preferred embodiment of the invention as illustrated in the accompanying drawings in which:

FIGURE 1 shows a plan view of the keyboard, partly broken away transversely; and FIGURE 2 illustrates an edge view of the keyboard taken on the line 2—2 of FIGURE 1 looking in the direction of the arrows; and FIGURE 3 illustrates the steps of manufacture of the keyboard; and FIGURE 4 illustrates a plan view of the keyboard with the top layers of material removed.

With reference now to the drawings, wherein like reference characters designate like or corresponding parts throughout the several views, there is shown in FIGURES 1 and 2 an insulating base member 10. Bonded thereto in a grid-like configuration is conducting layer or common bus 12, which is formed by any one of a number of well known means on the insulating base member 10 and which is formed with a plurality of spaces 14 within which a plurality of conducting pads 16 are formed. These pads are also bonded to the insulating base member 10 in the same manner as the grid-like common bus 12. Electrically connected to each of the conducting pads is a respective conducting element 18 which passes through the insulating member 10 to the bottom surface of the base member and from there to the associated connectors and circuitry (not shown) with which the keyboard is to be operated. Each of the conducting elements 18 is bonded to the lower surface of the base portion 10 in a manner well known in the printed circuit art.

Thus, each of the conducting pads 16 are set apart from the common bus 12 by means of spaces 14 so that under normal conditions the pads are electrically insulated from the common bus. Affixed to the upper surfaces 28 of the conducting pads 16 is a pressure-sensitive substance 20 which is characterized by having a resistivity which varies inversely with the application of pressure thereto. Various presure-sensitive substances may be used, but for the purposes of this invention it is preferred that a pressure-sensitive paint be utilized which is manufactured by Clark Electronics, a division of Advance Components Corporation of Santa Ana, Calif. Generally, a thinner coat will have a lower resistance to any given force than a thicker coat and a larger contact area will have a lower resistance than a smaller contact area. The resistivity of the paint, therefore, depends on the area, thickness and size of the contact area. As previously stated, other pressure-sensitive materials may be used, such as carbon-impregnated rubber materials, fibers impregnated with conducting particles, foamed materials impregnated with conductive materials or finely divided or granulated carbon.

The pressure-sensitive paint 20 is, thus, applied and allowed to strongly adhere to each of the conducting pads 16. Following the application of the paint, a conducting layer or sheet 22 is placed over the entire keyboard with at least one portion of the sheet 22 being placed in electrical contact with the common bus 12. Over the layer 22 is then placed an insulating layer 24 of plastic or other material which is bonded to the conducting layer 22. The appropriate decals 26 are then affixed to the insulating layer 24 and over the appropriate conducting pads for identification by the keyboard operator. In an alternative embodiment, the insulating layer need not be used and decals or key identification material can be placed directly on the conducting layer or sheet 22.

In the event that it is desired to shield the keyboard so as to provide security against undesired radiation, a layer of insulating material (not shown) could be placed over the conducting elements 18 on the underside of the base portion 10 and the conducting sheet 22 could then be extended to completely surround the keyboard to provide the necessary shielding.

In the operation of the printed circuit keyboard herein described, the board is first plugged into the appropriate connector and associated circuitry. Each of the conducting elements 18 is, thus, placed in an operable position with respect to the associated circuitry (not shown), as is the conducting element 18' which is associated with and electrically connected to the common bus 12. If the keyboard operator desires to activate a particular one of the circuits associated with a specific one of the conducting elements 16, the appropriate key tab is located by means of the decals 26. Then, by the application of normal finger pressure to the top of the appropriate decal, the pressure is transmitted to the pressure-sensitive paint 20 associated with the particular conducting pad located under the decal selected. The increase of pressure on the paint results in a reduction of the resistance of the paint and a concomitant reduction in the resistance between the common bus 12 and the selected conducting pad located under the decal. The resistance of the paint 20, when no pressure is applied, may be for example approximately 200K ohms and may be reduced to approximately 10 ohms with the application of normal finger pressure by the operator. A resistance range which is satisfactory for use with computer-type integrated circuits could vary from as high as 300 ohms when the key tab is depressed to as low as 5000 ohms when the key tab is not depressed. This reduction in the resistance enables the flow of current between common bus 12 and the conducting pad 16 located under the decal selected by the operator. This also enables the flow of current between the common conducting element 18' and the conducting element 18 associated with the selected conducting pad 16 so that the function of the keyboard is thus performed. As previously stated, the resistivity of the paint or other pressure sensitive material may be controlled by the amount of material used, etc. so that the amount of pressure required to alter the resistance may also be varied depending upon the circumstances of use of the keyboard.

FIGURE 3 illustrates a series of manufacturing steps which will result in the construction of an apparatus of this invention. The cross-sectional views shown in FIGURE 3 are taken along a line 3—3 as illustrated in FIGURE 4. Step No. 1 of FIGURE 3 shows an insulated board 301 upon which is bonded a conducting sheet 302. The bonding process is accomplished according to any of the well-known printed circuit board deposition or electroplating techniques. Step 2 illustrates the same insulated board 301 and conducting sheet 302 after the conducting 302 has been partially etched or eroded away. This erosion process is accomplished according to any of the well-known etching techniques known in the printed circuit arts. Step 3 illustrates the board of Step 3 after the etched cavities have been filled with an insulating material 303, such as epoxy.

Step 4 illustrates a further partial etch of the conductors 302. However, the outer edge conductor **302*a* is not eroded in this step. Step 5 shows the eroded pad cavities of Step 4 after being filled with a conducting material of the type described herein, having a resistivity inversely proportional to the pressure applied to its surface area. The depth of the erosion step shown in Step 4 is controlled to yield a conducting material 304 thickness as shown in Step 5 that will provide a resistance which is desirable for the particular electronic circuits which will be used in conjunction with the finished product. The cavities which Step 4** creates over the remaining conductive material are filled with an insulating material such as epoxy. This remaining conductive material ultimately forms the conductor paths between the conductive pads and the connector at one edge of the finished board.

Step 6 illustrates the addition of a conducting surface 305 over the entire board surface. Conducting surface 305 makes electrical contact with conductor **302*a* and also electrically contacts conductors 302 via a path formed through conducting material 304**.

Optional Step 7 illustrates a further layer of insulating material 308 applied over the entire surface atop layer 305. Layer 308 contains identifying symbols for the pads formed beneath it, or in addition, may provide a further insulator or electrical shield for the internal elements.

FIGURE 4 illustrates a plan view of the keyboard manufactured according to the steps of FIGURE 3, with the conductive pads 304 and printed circuit paths exposed for illustrative purposes only. Conductor **302*a* is illustrated extending around the outer edge of the board and is electrically connected to pin 402. Each of the conductor pads 304** is individually connected to a connector pin, and the board is adapted so that it may be plugged into a connector plug for electrical connection to other external circuitry (not shown).

This invention thus provides an extremely inexpensive printed circuit keyboard which is adapted to be plugged directly into the circuits with which it is to operate. The keyboard provided by this invention is of small and compact size so as to eliminate the need for the often considerable amount of back-panel space now required by mechanical keyboards and is of rugged construction so as to eliminate the need for frequent maintenance or replacement.

Other changes and modifications can be made to the embodiment described herein and still remain within the scope of this invention. For example, a keyboard according to this invention could be constructed having the feature of illuminating each of the keys from behind the board surface by constructing each of the key pads in a doughnut-shaped configuration. In this embodiment the key symbols could be imprinted on transparent or semi-opaque layer and a light mounted behind the board could be activated to illuminate the key symbol through the doughnut-shaped pad.

Although a single preferred embodiment of the invention has been herein described, it should be understood that various modifications and alternative embodiments are contemplated within the scope of the present invention. It is therefore to be understood, that within the scope of the appended claims, the invention may be practiced otherwise than as specifically described.

What is claimed is:

1. A compact keyboard for use with associated connectors and circuitry, comprising:

an insulating base member;

a plurality of conducting pads in spaced relationship and secured to said base member;

pressure-sensitive material applied to at least a portion of said pads, said material being characterized by a resistivity which varies inversely with the application of pressure thereto;

common bus means affixed to said base member and in spaced relationship from said pads;

a conductive layer in overlying relationship with said pressure-sensitive material, in electrical connection thereto and in electrical connection with said common bus means; and electrical conducting means for electrically connecting said conductive layer to said associated connectors and circuitry.

2. A keyboard as in claim 1 wherein said pressure-sensitive material is a pressure-sensitive paint.

3. A keyboard as in claim 2 wherein said electrical conducting means further comprises a printed circuit pattern secured to said base member.

4. A keyboard as in claim 3 further including an insulating layer covering said conductive layer and in bonded relationship therewith.

5. A printed circuit keyboard as in claim 4 wherein the resistance between the common bus and each of said conducting elements, respectively, is variable from a minimum of 5000 ohms with no pressure applied to said material to a maximum of 300 ohms with pressure applied to said material.

6. A printed circuit keyboard of compact configuration adapted to be plugged into associated connectors and circuitry, comprising:

(a) a flat base member of electrically insulating material; spaced electrically conducting pads on said base member and affixed thereto;

(b) a plurality of conducting elements affixed to said base member and in respective electrical contact with said pads;

(c) pressure sensitive material affixed to selected portions of certain of said pads, wherein the electrical resistance of said material varies inversely according to the pressure applied thereto;

(d) a common bus member affixed to said member and in spaced relationship from said pads and said conducting elements;

(e) an electrically conducting sheet in electrical common with said bus and in overlying and contacting relationship with respect to said material; said bus and said conducting elements adapted to be electrically coupled to said connector and associated circuitry wherein pressure applied to said conducting sheet over a said pad acts to lower the electrical resistance of said material on the said pad and to enable current to flow between said bus and the respective conducting element associated with the said pad to operate on said associated circuitry.

7. A printed circuit keyboard as in claim 6 wherein said conducting elements are affixed to said flat base member on the side thereof opposite from that upon which said conducting pads are located.

8. A printed circuit keyboard as in claim 7 wherein said bus is a grid-like configuration.

9. A printed circuit keyboard as in claim 8 wherein said base member is composed of glass.

10. A printed circuit keyboard as in claim 9 further including selected decals affixed to said conducting sheet above certain of said pads.

11. A printed circuit keyboard as in claim 8 wherein the resistance between the common bus and each of said conducting elements, respectively, is variable from a minimum of 5000 ohms with no pressure applied to said material to a maximum of 300 ohms with pressure applied to said material.

12. A printed circuit keyboard as in claim 11 wherein said pressure-sensitive material is a pressure-sensitive paint.

13. A method of manufacturing a printed circuit keyboard comprising the steps of:

(a) forming and bonding an electrically conductive surface to an insulating base member;

(b) selectively eroding away said conductive surface to form a pattern of conductive pads and conductive paths;

(c) filling the cavities created by the erosion process of step (b) with an insulating material;

(d) selectively and partially eroding said conductive paths and said conductive pads;

(e) filling the cavities over the conductive pads created by the erosion process of step (d) with a conducting material having the characteristic that its resistivity is inversely proportional to the pressure applied, and filling the cavities over the conductive paths created by the erosion of step (d) with an insulating material;

(f) overlaying a conductive sheet over said conducting material and said conductive paths to form an electrical connection between said conducting material and exposed conducting paths which were not selectively eroded in step (d).

14. A method as in claim 13 further comprising:

(g) attaching an electrical connector to said insulating base member and electrically coupling contacts on said connector to selected conductive paths.

15. A method as in claim 13 wherein the erosion steps are accomplished by using a photomask pattern and an acid etch.

16. A method as in claim 15 wherein the conducting material is a pressure-sensitive paint.

References Cited

UNITED STATES PATENTS

| | | | |
|---|---|---|---|
| 1,701,386 | 2/1929 | Mucher | 338—100 |
| 1,904,352 | 4/1933 | Bradley | 338—100 |
| 2,064,841 | 12/1936 | Liebmann | 338—308 XR |
| 3,185,947 | 5/1965 | Freymodsson | 336—200 |

THOMAS J. KOZMA, Primary Examiner

U.S. Cl. X.R.

29—610, 620; 200—52; 338—100